United States Patent

[11] 3,584,910

| [72] | Inventor | Sam Lupul |
| | | Red Deer, Alberta, Canada |
| [21] | Appl. No. | 774,040 |
| [22] | Filed | Nov. 7, 1968 |
| [45] | Patented | June 15, 1971 |
| [32] | Priority | Jan. 5, 1968 |
| [33] | | Canada |
| [31] | | 9,145 |

[54] LIGHT FILTER FOR MOTOR VEHICLES
3 Claims, 7 Drawing Figs.

[52] U.S. Cl. .................................................. 296/97, 160/23
[51] Int. Cl. .................................................. B60j 3/00
[50] Field of Search ........................................ 296/97; 160/23, 29, 30, DIG. 10, DIG. 2

[56] References Cited
UNITED STATES PATENTS

| 1,333,516 | 3/1920 | Thomsen | 296/97 X |
| 1,455,475 | 5/1923 | Bullock | 160/23 |
| 1,591,739 | 7/1926 | Blake | 296/97 X |
| 1,637,763 | 8/1927 | Clegg | 160/DIG. 2 |
| 2,701,612 | 2/1955 | Steidl | 296/97 X |
| 2,747,927 | 5/1956 | Burkhead | 296/97 |
| 3,183,033 | 5/1965 | Stulbach | 160/230 X |

FOREIGN PATENTS

| 244,277 | 12/1925 | Great Britain | 296/97 |

*Primary Examiner*—Kenneth H. Betts
*Assistant Examiner*—John A. Pekar
*Attorneys*—Arne I. Fors and Frank I. Piper ABSTRACT: A light filter for use with motor vehicles comprising a color-tinted transparent screen roller-mounted within a housing which is secured by spring clip means to a vehicle sun visor or side window. The screen is adapted to be extended from the housing for securement to a vehicle window.

PATENTED JUN 15 1971  3,584,910
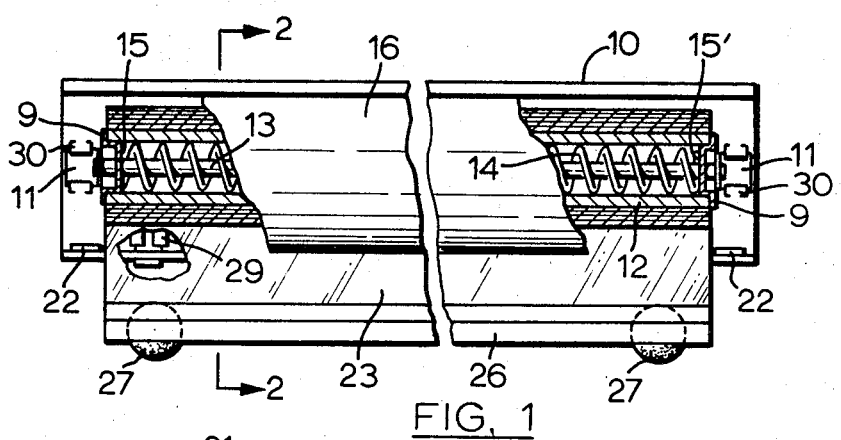
FIG. 1
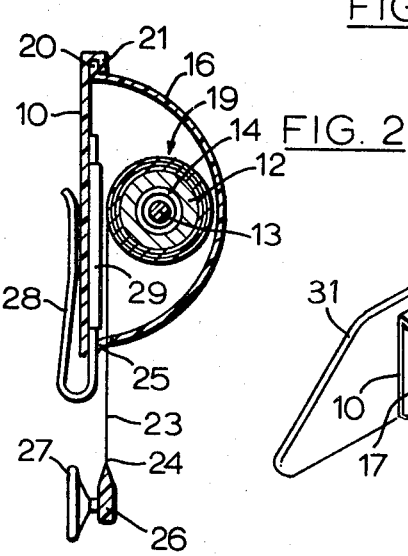
FIG. 2
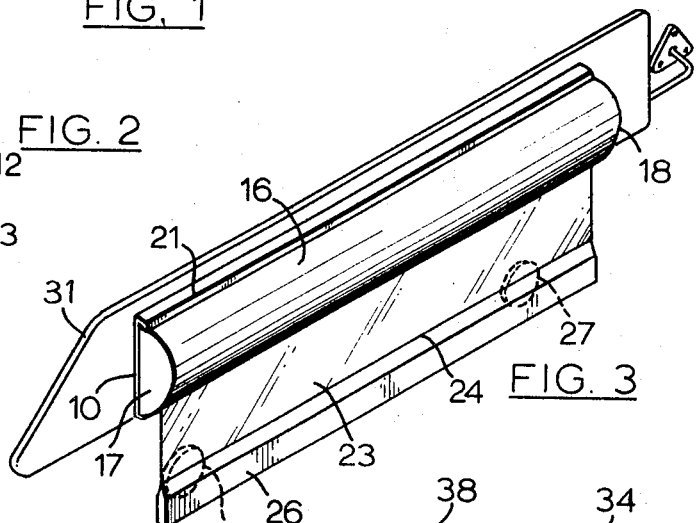
FIG. 3
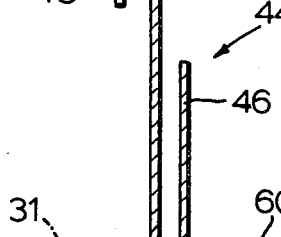
FIG. 5
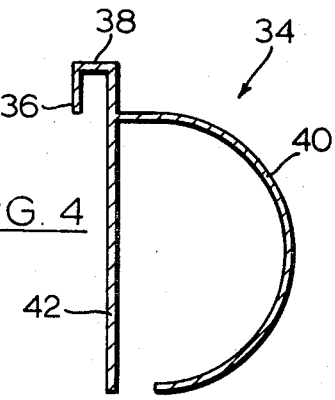
FIG. 4
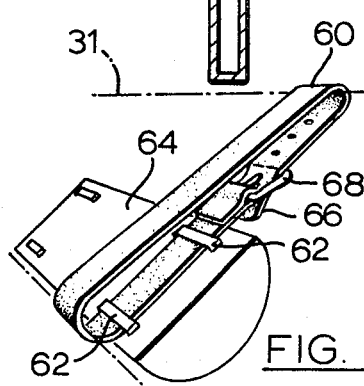
FIG. 6
FIG. 7
*INVENTOR.*
SAM LUPUL
BY *Arne J. Fors*
Agent

LIGHT FILTER FOR MOTOR VEHICLES

BACKGROUND OF THE INVENTION

This invention relates to a new and useful improvement in a light filter for use with motor vehicles, for eliminating difficulty arising from driving against a light source, such as the sun in the daytime, and the headlights of oncoming motor vehicles at night.

Many attempts have heretofore been made to overcome these difficulties, all of which have suffered from disadvantages in complexity and effectiveness, all of which have required intricate mounting devices.

The principal object of the present invention is to provide a light filter for use with motor vehicles, comprising a roller-mounted transparent screen, color-tinted to restrict glare from light sources, which may be readily mounted upon a conventional sun visor with which virtually all production automobiles are equipped, in order to restrict oncoming glare, or alternatively, which may be as readily mounted to the upper edge of a rollup-type side window of a motor vehicle, to restrict glare from a side source.

It is a further object of this invention to provide a light filter for use with motor vehicles, the filter screen of which may be readily extended from its housing, when mounted in a motor vehicle, and secured in operating position in such extended fashion by its free end to the surface of the windshield or side window, and just as readily released when no longer required, for compact storage within the housing.

SUMMARY OF THE INVENTION

In its broad aspect, the apparatus of the present invention comprises a flexible, color-tinted transparent screen, roller-mounted within a housing, a rigid strip secured to the free end of said transparent screen adapted to restrain the free end of the screen from reentry into the housing under spring biasing applied to said roller, a suction fastener secured to the rigid strip, and fastening means secured to the housing adapted to provide removable mounting thereof to the upper edge of a motor vehicle side window or a motor vehicle sun visor.

Other and more specific objects, features and advantages of the invention will appear from the detailed description hereinafter following, reference being had to the accompanying drawings which form a part of this disclosure and which illustrate, merely by way of example, preferred forms of apparatus for the practice of the invention.

DESCRIPTION OF THE DRAWINGS

This invention consists essentially in the arrangement of parts, all as more particularly hereinafter described.

In the drawings:

FIG. 1 is a front elevation of the device of the invention, showing parts thereof broken away in section to illustrate certain structural features thereof;

FIG. 2 is a transverse section through the device taken on the line 2-2 of FIG. 1;

FIG. 3 is a perspective view of the device of the invention, showing the device in place on a conventional sun visor;

FIGS. 4, 5 and 6 are transverse sections of three additional embodiments of spring clips for securing the device of the invention to a sun visor or window; and FIG. 7 is a perspective view of the device of the invention showing a strap connector embodiment.

In the drawings, like characters of reference indicate corresponding parts in the different figures.

DESCRIPTION OF THE PREFERRED EMBODIMENTS

Proceeding therefore to describe the invention in detail, reference should be first made to FIGS. 1—3. The light filter as here shown comprises a base member 10, which is essentially a flat rectangular plate, of sufficient rigidity to provide a mounting surface for the components of the invention, as will be hereinafter described.

Mounted to the base member 10, by means of a pair of mounting brackets 11, is a cylindrical roller 12, having an axle 13, protruding longitudinally axially from each end of the roller 12 through centering end spacers 9 and engaging in apertures in the mounting brackets 11, for easy rotation therein.

A helical spring 14, circumferentially engaging the axle 13, provides axial rotational bias of the roller 12 by means of the engagement of the spring 14 at its fixed end 15 with the mounting bracket 11 and at its opposite end 15' with the roller 12.

A semicylindrical cover 16 constructed of resilient material and having closed ends 17 and 18 encloses the roller assembly generally designated 19 for dust protection and appearance. Desirably, the cover 16 is mounted on the base member 10 by engagement of the lower edge thereof with the projections 22 on the base member 10, and engagement of the upper edge 20 thereof with a lip 21 formed in the upper edge of the base member 10, as is depicted more clearly in FIG. 2, permitting removal of cover 16 from base member 10 by disengagement of the cover lower edge from projections 22.

A length of flexible, color-tinted transparent plastic sheet 23 is secured at one end to the roller 12, as by stapling, adhesives or other convenient means, and is wound onto the roller 12, with its free end 24 extending through a slot 25, formed in the lower longitudinal edge of the cover 16. A rigid strip 26 is secured to the free end 24 of the screen 23, as depicted in FIG. 3, and restrains the said free end of the screen 23 from passing inwardly through the slot 25. A pair of rubber suction cups 27 are secured to the rigid strip 26, as depicted in the drawings. Screen 23 can be a sheet or film of polycarbonate such as "Lexan," manufactured by General Electric Co., or polyester such as "Mylar," manufactured by E. I. Dupont De Nemours and Co., Inc., color-tinted by for example, pigments or dyes.

A pair of U-shaped spring clips 28 are adjustably secured to the bottom surface of the base 10, as with brackets 29, so that the spring clips 28 may be adjusted for mounting of the base member 10, as depicted in the drawing FIG. 3, on a sun visor 31. The mounting brackets 11 may conveniently be secured to the base 10 by means of lugs 30, formed integrally with the base 10.

The base member 10, the cover 16, the rigid strip 26, and the roller 12 may be conveniently injection moulded of acrylic or polyethylene plastic, or the roller 12 may be of wood, in order to receive the staples securing the transparent flexible screen 23.

FIGS. 4, 5 and 6 show additional embodiments of spring clips for securing the device of the invention to a sun visor or window. FIG. 4 illustrates a spring clip 34 having a channel 36 adapted to receive an automobile window edge, i.e. upper edge of a rollup side window, not shown. Web 38 can be varied as to width to suit the thickness of window glass or metal stripping sometimes secured to a convertible automobile side window. Arcuate portion 40 of clip 34 is adapted to tightly envelop cover 16 and secure base 10 against clip portion 42.

FIG. 5 illustrates a spring clip 44 having a leg 46 adapted to be received in brackets 29 formed on base 10. Channel 48 formed on the upper portion of clip 44 is adapted to receive an automobile window edge, as described above with reference to FIG. 4.

FIG. 6 illustrates another spring clip 50 having an arcuate portion 52 for securing cover 16 and base 10 to intermediate spring portion 54 and a second arcuate portion 56 for securing intermediate portion 54 to a sun visor gripped therebetween.

FIG. 7 illustrates the use of leather or the like straps, as designated by numeral 60, for securing the device to sun visor 31. Strap 60 passes through brackets 62 formed in the base 64 of the device, is wrapped about visor 31 and the free end 66 is engaged by buckle 68.

In operation, the device is optionally affixed to a motor vehicle sun visor or upper edge of a motor vehicle side window, by means of the spring clips 28, 34, 44 or 50 or straps 60. The bias induced by the spring 14 on the roller 12 retains the screen 23 in a wound position until the screen is withdrawn manually from the housing, and secured in its extended position by means of the adhesion of the suction cups 27 on the windshield or side window. The screen 23 can be made in any desired color which will reduce glare, such as blue, green or amber.

I claim:

1. A light filter for use with motor vehicles comprising, in combination, a base member, a cover member defining a longitudinal slot therein secured to said base member, a roller journal mounted upon said base member, a flexible color-tinted transparent screen secured at one end thereof to said roller and extending from its free end through said longitudinal slot, biasing means adapted to wind said transparent screen on said roller, a rigid strip secured to the open end of said transparent screen, a suction fastener secured to said rigid strip, and fastening means comprising a pair of spring clips secured to said base member, aid spring clips each having a leg portion and said base member having brackets for adjustably receiving each said leg portion for securement of said clips to the base member, and said spring clips each having a U-shaped or channel-shaped portion for engaging a vehicle sun visor or the upper edge of a vehicle side window.

2. A light filter as claimed in claim 1 in which said cover member is hinged onto said base member and has fastening means adapted for releasably securing the cover member to said base member.

3. A light filter according to claim 2 in which each of said spring members has an arcuate portion adapted to tightly envelop and grip the cover member.